United States

Frattarola

[11] 3,758,649

[45] Sept. 11, 1973

[54] METHOD OF MANUFACTURING HOLOGRAPHIC REPLICAS
[75] Inventor: Joseph Ralph Frattarola, Hightstown, N.J.
[73] Assignee: RCA Corporation, Princeton, N.J.
[22] Filed: June 21, 1971
[21] Appl. No.: 155,254

Related U.S. Application Data
[63] Continuation of Ser. No. 861,608, Sept. 29, 1969, abandoned.

[52] U.S. Cl.................... 264/1, 264/175, 264/220, 350/3.5
[51] Int. Cl............................................ B29d 11/00
[58] Field of Search.................... 350/3.5; 96/27 H; 161/2, 4, 116, 117, 123; 264/1

[56] References Cited
UNITED STATES PATENTS
3,565,978   2/1971   Folger et al................... 350/3.5
3,265,776   8/1966   Henkes.......................... 264/1
3,314,052   4/1967   Lohmann...................... 350/162 X
3,610,722   10/1971  Bestenreiner et al............ 350/3.5

FOREIGN PATENTS OR APPLICATIONS
1,139,955   1/1969   Great Britain................. 350/3.5

Primary Examiner—David Schonberg
Assistant Examiner—Ronald J. Stern
Attorney—Glenn H. Bruestle

[57] ABSTRACT

A holographic replica in the form of a tape comprises a thermoplastic vinyl polymeric sheet having holographic information in the form of a relief pattern embossed on a surface thereof. The polymeric sheet generally has a thickness of 1 to 6 mils. and the embossed information generally has a contour depth of about up to 500A. The process for making the holographic replicas comprises embossing a pattern consisting of peaks and valleys from either an original holographic image or a holograph master onto a thermoplastic polymeric sheet at a temperature substantially below the flow temperature of the thermoplastic sheet and with a pressure of less than about 200 psi.

8 Claims, 4 Drawing Figures

Patented Sept. 11, 1973  3,758,649

INVENTOR.
Joseph R. Frattarola
BY

ATTORNEY

Patented Sept. 11, 1973

INVENTOR.
Joseph R. Frattarola
BY

ATTORNEY

METHOD OF MANUFACTURING HOLOGRAPHIC REPLICAS

This application is a continuation of my copending application, Ser. No. 861,608, filed Sept. 29, 1969, now abandoned.

BACKGROUND OF THE INVENTION

This invention relates to holograms and more particularly to hologram replicas impressed upon tape hereinafter referred to as Holotape and the method for making Holotape replicas.

A hologram is a recording in the form of an interference fringe pattern of all the information in a wave front of light obtained from an object which is illuminated with spacially monochromatic light.

This form of an image differs substantially from the image of an object obtained in ordinary photography. Virtual and real images of the original object can be reconstructed from the hologram by illuminating the hologram with spacially coherent monochromatic light. A detailed description of holography appears in the article, "Photography by Laser," by Emit N. Leith and Juris Upatnicks appearing on page 24 of the June, 1965 issue of Scientific America.

Normally, a hologram is recorded on silver emulsion photographic plate, the pattern of interference fringes thereof being manifested by variations in the opacity of the developed plate. However, it has been found that the thickness of the emulsion of a developed hologram plate is a linear function of opacity of the emulsion. Thus the pattern of interference is also manifested by a relief pattern with respect to the ground plane of the emulsion surface which is made up of a plurality of profile contours, the relative position and the relative magnitude of which manifest the holographic information. Such a relief pattern may be employed, independently of any difference in opacity of the photographic plate, in the reconstruction of the holographic information.

More particularly, one may make use of the phase delay related to the profile contours in order to reconstruct the holographic information. This technique is termed phase holography and holograms employing this technique are termed phase holograms.

A phase hologram, in the first instance, need not necessarily be prepared from a silver emulsion photographic plate. Photoresist materials and tehniques, well known in the art, may be alternatively employed in preparing a phase hologram. Phase holograms as made directly from the object are termed original holograms. Metal hologram masters may be prepared from the original phase holograms by electroless plating and electroplating techniques so as to reproduce the holographic information on a metallic master. The advantage of preparing hologram masters is that many replicas can be made from a single metal hologram master due to the dimensional stability of such a master.

The principal benefit of phase holograms, as far as the present invention is concerned, is that they may be utilized as original tapes from which mass produced, inexpensive replicas can be made either directly or indirectly by means of a metal recording master.

The technique herein described for making Holotape replicas involves embossing information onto thermoplastic sheet material. Typical prior art embossing techniques may be found with reference to U. S. Pat. Nos. 2,297,846; 2,609,568 and 2,849,752 issued to W. H. Venschoten, R. E. Getchell and T. G. Leary, respectively. Although the novel technique disclosed herein is somewhat similar to the prior art embossing techniques, the prior art techniques do not provide Holotape suitable for high fidelity reproduction. This is essentially because of the differences between phase holographic information and prior art embossed replicas. One major difference between these prior art embossed replicas and the embossed phase hologram replica is a high resolution required for phase hologram replication especially for use as a recording media for video information. Another major difference is the peak to valley depth of the contours which make up the hologram as compared to the depth of prior art embossed replicas on tape.

More particularly, the resolution required for Holotape useful in TV recording is on the order of 1 micron as compared to the resolution on the order of 1–100 mils for purposes of prior art embossing. The average peak to valley depth of a typical Holotape comprising redundant Frauenhoffer holograms is on the order of about 500 A as compared to the peak to valley depth in the order of 1–100 mils in the prior art embossed tapes. Additionally, commercial Holotape for TV must meet requirements with relation to tape strength, thickness, deformability and the like so as to provide a tape that may be reused time and time again.

Holotape replicas produced in accordance with prior art teachings of embossing techniques do not result in Holotapes having adequate resolution and fidelity of the recorded information. In order to produce a high quality, high resolution, inexpensive Holotape replica of the type referred to above, manufacturing methods had to be altered from that given in the prior art. For example, the prior art teaching of bringing a thermoplastic sheet, used as replica material, to its flow temperature during embossing results in deformed holograms when applied to embossing Holotapes. In addition, it was found that the surface quality of the thermoplastic sheet material should be of a certain minimum standard in order to obtain optimum Holotape replicas for use in TV recording. Almost any sheet material could be used in prior art embossing.

SUMMARY OF THE INVENTION

A holotape replica comprises a thermoplastic polymeric flexible tape having holographic information in the form of a relief pattern embossed on the surface thereof.

The process for making a Holotape replica comprises embossing a relief pattern consisting of peaks and valleys from either an original Holotape or from a Holotape master onto a flexible thermoplastic polymeric sheet at a temperature substantially below the flow temperature of the thermoplastic polymer.

DETAILED DESCRIPTION OF THE INVENTION

Figure 1:
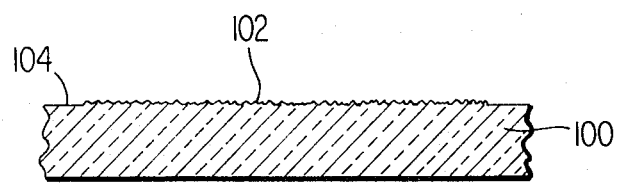
FIG. 1 shows a greatly magnified cross-sectional view of the contour or relief pattern of a hologram on a Holotape.

FIG. 1 is a greatly magnified cross-sectional view showing the relief pattern of a typical hologram embossed onto one surface of a flexible thermoplastic polymeric resinous sheet 100. This relief pattern consists of a plurality of profile contours 102 with respect to the ground plane 104 of the surface on which it is impressed. The contours 102 may be said to consist of alternating peaks and valleys. The holographic information is manifested by the relative position and relative magnitude of these profile contours 102. The thermoplastic polymeric sheet material 100 onto which the hologram is embossed should be dimensionally stable, flexible, and preferably transparent and isotropic. In fact, in order to produce high quality Holotape replicas of a type which may be useful in video recording, the thermoplastic sheet material should be of an optical quality better than that of window glass and should be essentially free of internal stresses as may be observed under polarized light.

A preferred Holotape replica consists of a flexible, transparent, cast vinyl thermoplastic material having a thickness of from about 1 to 6 mils. and which is optically clear and isotropic and essentially free of internal stresses. Cast vinyl is said to have a belt side and an air side. The belt side is that side which was in contact with the support used during the casting operation. The air side is that side which remained in contact with the atmosphere during casting. preferably, the hologram is impressed on the belt side of the cast vinyl as opposed to the air side of the cast vinyl. The use of cast vinyl as opposed to, for example, calendered vinyl, has been found to be important in obtaining the highest possible quality Holotapes for use in video recording and information display. This is due to the fact that the surfaces of calendered vinyl and other calendered thermoplastic materials do not provide the optical clarity required for truly high resolution, low noise Holotapes. Additionally, they exhibit stress patterns under polarized light which adds to the noise.

The surfaces of cast vinyl are generally fairly clear to the eye. However, the belt side generally possesses microscopic scratches while the air side of the cast vinyl is relatively free of such scratches. These microscopic scratches are of no consequence when embossing items such as credit cards or stereograms as appears in the prior art. However, they are of utmost importance when preparing Holotape replicas for essentially noise free video recording. It is believed that this is due to the fact that the scratches are often about the same size as the resolution of the hologram relief pattern and causes interference of the light passing through the Holotape resulting in noise during playback of the recorded video information. By embossing the hologram onto the belt side of the cast vinyl the microscopic scratches are essentially eliminated so that light passing through the Holotape is not distorted due to the microscopic surface imperfections of the Holotape.

The particular vinyl material which has given best results is a plasticized polyvinyl chloride-vinyl acetate copolymer made by the Cadco Film Division, a subsidiary of Cadillac Plastic & Chemical Co., formulation number C-102.

A typical Holotape is about ½ inch wide having holographic information thereon in patterns of about 5 × 10 millimeters square. However, tapes of almost any width can be used, provided, of course, that the holographic information can fit thereon. Typical tape thickness is from 1 to 6 mils. and the usual peak to valley depth of the holographic contours are on the order of 500A.

Since the Holotape will generally be used in conjunction with a tape transport system, it is necessary that the Holotape have physical characteristics such that it is not deformed when under the tension of the transport system. The preferred tape mentioned above has the physical characteristics which makes it possible to manufacture Holotapes and to use Holotapes in standard tape transport apparatus. For example, the tape has a tensile strength of 5000 psi and a maximum elongation before rupture of 5 percent.

Figure 2:
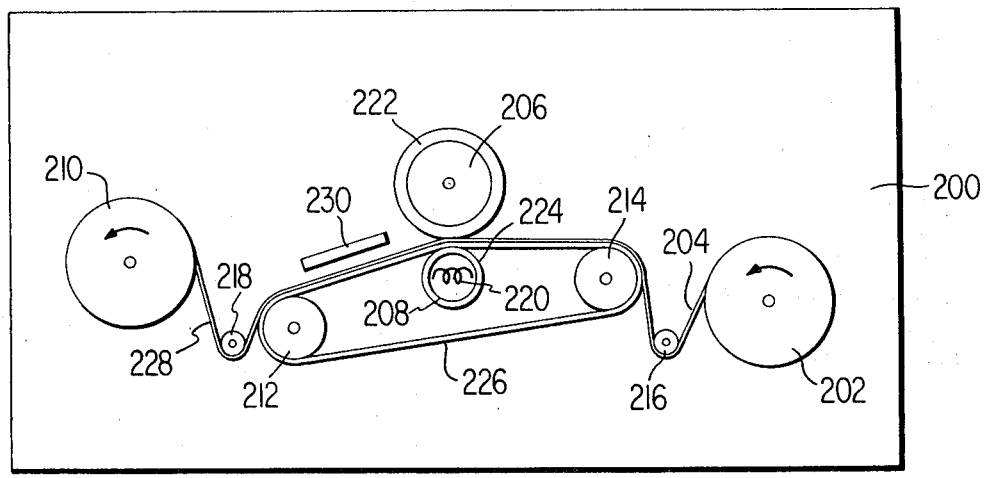
FIG. 2 is a diagrammatic view showing the elements of apparatus useful in the method of preparing Holotape.

High quality, high resolution and inexpensive Holotape replicas useful for video display systems can be made utilizing the apparatus shown in FIG. 2.

The embossing apparatus of FIG. 2 comprises a support frame 200 to which is attached a rotatable tape feed reel 202 containing the tape 204 to be embossed, rotatable upper and lower calender rollers 206 and 208 respectively, a Holotape replica takeup reel 210, left and right Holotape master support rollers 212 and 214 and first and second rotatable tape guide wheels 216 and 218.

The upper calender roller 206 is mounted on the frame so as to be movable in a manner such that the pressure between the calender rollers 206 and 208 can be varied. The lower calender roller 208 is provided with a resistance type heating element 220 in the hub of the roller 208. The surfaces of the calender rollers 206 and 208 are provided with coatings 222 and 224, respectively, of a yieldable material, preferably silicone rubber.

The tape 204 to be embossed passes under the first guide wheel 216 and over and contiguous with the metal master Holotape 226. The metal master 226 is in the form of a continuous loop and contains the holographic relief pattern to be embossed onto tape 204. The master 226 is supported by the Holotape master support rollers 212 and 214 and is in contact with and passes over the heated lower calender roller 208 which heats the master. The tape 204 to be embossed remains in contact with the metal master 226 as they pass through the calender rollers 206 and 208 where the holographic relief pattern is pressed therein thereby forming a Holotape replica 228. The Holotape replica 228 remains in contact with the master 226 for a time sufficient for it to cool. This cooling prevents undue distortion of the relief pattern when peeling the replica 228 from the master 226. Peeling of the replica 228 from the master 226 is accomplished by passing the replica 228 under the second guide wheel 218 which is positioned in a manner so as to cause the cooled replica 228 to be pulled from the master 226. The peeled replica 228 is finally wound on the take-up wheel 210. The apparatus is powered by a motor (not shown) which drives both the take-up wheel 210 and the heated calender roller 208 with a force so as to continuously move the tape 204 and the master 226.

EXAMPLE I

The apparatus as described above wherein the heated calender roller and the master support rollers are 2 inches in diameter and the upper calender roller is 9 inches in diameter is employed for making Holotape replicas.

A 2-5 mil. thick nickel master containing the holographic information to be replicated is placed in position on the master support rollers and over the lower calender roller. A 2-mil. thick thermoplastic tape is then hand fed through the system from the feed reel to the take-up reel as shown in FIG. 2. The preferred tape is a 2 mil. thick cast vinyl such as that sold by the Cadco Films Division of Cadillac Plastic and Chemical Company under the code number C-102 having a flow temperature of 155°C. ± 1°C. This tape is fed through the apparatus so as to emboss the holographic pattern on the belt side of the tape. The heater is energized so as to heat the nickel master to a temperature of 72°C. and the drive motor is actuated so as to pass 0.2 inch of tape per second through the rollers during replication. When the master comes to temperature the upper calender roller is engaged so as to apply a pressure of about 10-20 psi to the tape and master between the calender rollers.

EXAMPLE II

The same general procedure as recited in Example I is followed except that the tape transport speed is increased to 1.2 inches/sec. and the temperature is increased to 85°C.

EXAMPLE III

The same general procedure as recited in Example I is followed except the tha tape transport speed is increased to 18.75 inches/sec. and the temperature is increased to 100°C.

EXAMPLE IV

With a vinyl having a thickness of 4 mils. and running at a tape speed of 0.2 inch/sec. the temperature of the nickel master is raised to 73°C. and a pressure of about 10-20 psi is applied during embossing.

EXAMPLE V

With a vinyl having a thickness of 4 mils. and the apparatus running at a tape speed of 18.75 inches/sec. the temperature of the nickel master is brought to 125°C. and the applied pressure is about 20-40 psi.

It can be seen from the Examples that the optimum specific operating parameters of temperature and pressure vary with replica tape thickness as well as the speed of replication. Generally, tape thickness in the order of 1-6 mils. is preferred. Table 1 gives some indication of optimum operating temperatures as a function of replica tape thickness and the speed of replication using the aforementioned Cadco cast vinyl tape.

TABLE I

| Thickness | Speed in./sec. | Temp °C. | Pressure psi |
|---|---|---|---|
| 6 | 18.75 | 130 | 50-100 |
| 6 | 0.2 | 75 | 50-100 |
| 4 | 18.75 | 125 | 20-40 |
| 4 | 0.2 | 73 | 10-20 |
| 2 | 18.75 | 100 | 10-20 |
| 2 | 0.2 | 72 | 10-20 |

Although optimum results are attainable using the parameters given in the Examples and the table, it is possible to somewhat vary these parameters and maintain high quality replicas. Generally, an increase in the pressure of up to about 200 psi accompanied by a decrease in the temperature of the optimum parameters previously given are feasible. Additionally, somewhat higher temperatures may be necessary for the production of holographic replicas having a thickness greater than 6 mils.

A prime feature of the novel method is that the embossing temperature is significantly lower than the flow temperature of the thermoplastic replica material so as to provide a substantially distortion free holographic pattern on the replica as well as an optically clear replica free of minute bubbles or carbonaceous material. Preferably, the embossing temperatures are maintained at a factor between about 0.30 to about 0.85 of the flow temperature of the replicating material. Temperatures slightly outside this range may also be suitable depending upon the tape thickness, embossing speed and pressure.

Another feature of the novel method is the discovery that it is preferable to heat the calender roller in contact with the master as opposed to heating the roller in contact with the replica tape. It was found that greater distortion of the holographic pattern results if the calender roller in contact with the replica tape is heated.

Still another feature of the novel method is the discovery that the quality of the Holotape replicas are improved when both calender rollers have a yieldable surface such as of silicone rubber, as compared to only one roller or neither of the rollers having such a surface.

Yet another feature of the novel method is the discovery that higher quality Holotapes can be made from cast thermoplastics, especially cast vinyls as compared with calendered or extruded materials. An additional feature is the further discovery of embossing the hologram relief pattern on the belt side of the cast material as opposed to the air side to give improved Holotape replicas.

Another feature is the cooling of the replica prior to parting or peeling it from the master. This step can be facilitated in the apparatus shown in FIG. 2 by employing a cooling means 230. The cooling means 230, which may be a metal block having a multiplicity of orifices through which compressed air can be passed, is situated essentially parallel to and above the Holotape replica 228 along the length that the replica 228 remains in contact with the master 226. The tape is cooled to a temperature to minimize distortion or elongation upon separating the tape from the master. Typically, the tape is cooled to a temperature of from about 25°C - 50°C.

The thermoplastic tape used for replication should preferably have a maximum elongation prior to rupture of 5 percent at room temperature. Tapes having greater elongation prior to rupture tend to have the replicated holographic relief pattern distorted to such a degree as to degrade the image seen during play-back. Additionally, the tape must be flexible and capable of being wound on reels. While the examples recited above all relate to pure vinyl tape, the thermoplastic may be in the form of a laminated tape, such as, vinyl coated on a Mylar base. This type of configuration may offer advantages in tape strength.

Although the tape master is preferably made of nickel, other metals or plastics having a higher temperature stability than the replicating material may be employed as the master provided that the replica can be separated from the master after embossing.

Audio information can be reproduced simultaneously on the replica along with holographic video information where the audio information is in the form of a relief pattern.

Although the preferred Holotape is transparent so that the holographic information can be read via transmitted light, it is within the teachings of the present invention to utilize non-transparent tape and/or reflectively coated tape as well. Such non-transparent or reflectively coated Holotape will then be played back via reflected light. The same methods as used in preparing transparent Holotape replicas are applicable to non-transparent Holotape.

Figure 3:
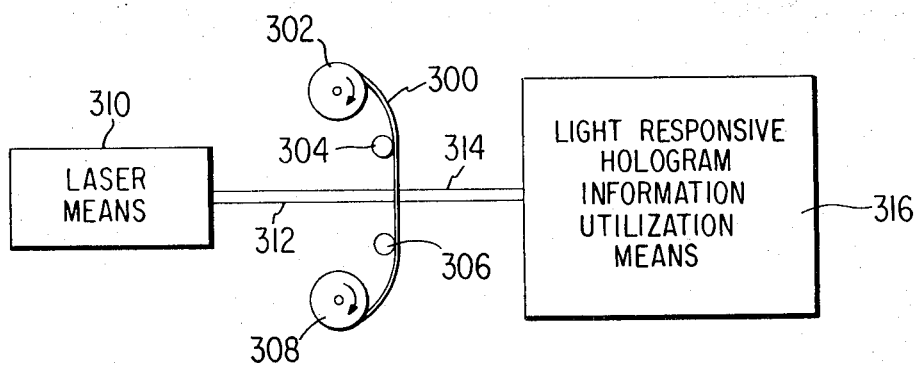
FIG. 3 shows in general form apparatus for playing back a transparent Holotape made in accordance with the present invention.

Referring now to FIG. 3, there is shown in generalized diagrammatic apparatus for reading out or playing back an embossed transparent Holotape of the type shown in FIG. 1. More particularly, as shown in FIG. 3, the transparent Holotape 300 is supported on a tape transport mechanism consisting of a rotatable feed reel 302 from which the tape extends around a first capstan or bearing guide 304 then around a second capstan guide 306 and onto a motor driven rotatable take-up reel 308. The take-up reel 308 pulls the Holotape 300 from the feed reel 302 in a manner so as to keep the Holotape taut and under constant tension. A source of spacially coherent monochromatic light, which is preferably a laser means 310, passes a beam of spacially coherent monochromatic light 312 through the holographic relief pattern of the Holotape 300 to produce an information beam 314. The cross-sectional area of beam 312 is preferably slightly smaller than the area of the individual microholograms of the Holotape. The information beam 314 is applied as an input to light responsive holographic information utilization means 316. A typical laser useful in the readout of the hologram is a 0.5 to 2 milliwatt He—Ne laser.

The utilization means 316 may take one of several forms. It may simply be a screen for directly displaying the image formed by the information beam 314. However, when used in combination with a television receiver for the playback of video information or with other similar electronic display means, the utilization means 316 would include a transducing means for converting the light information of the information beam 314 into electrical form and means for making use of this electrical form. For example, where video information stored on the Holotape is to be viewed on a television receiver, the tape utilization means may consist of a small television camera tube which produces electrical signals from the information beam which signals are then fed into the television receiver for conversion to ordinary television viewing. The tape transport mechanism makes it possible to move the Holotape 300 at any desired rate of speed so as to obtain slow motion effects of video information or to obtain stop action at any given point. In order to obtain low noise, high fidelity television pictures from the Holotape, the Holotape must have a resolution of at least about 1 micron and must be of such optical quality that the spacially coherent light giving rise to the information beam is undistorted by imperfections or stresses in the Holotape.

Figure 4:
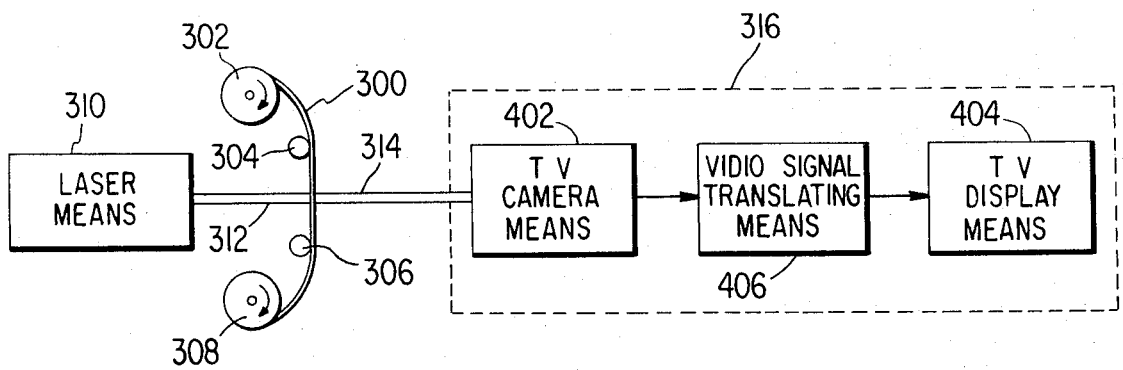
FIG. 4 shows in general form special cases of light responsive hologram information utilization means for black and white or color TV displays.

FIG. 4 shows a system wherein the light responsive utilization means 316 comprises a television pick-up tube 402 such as a vidicon which is illuminated with the information beam 314. The vidicon 402 converts the information beam into an electrical video signal which is applied to a television display means 404 through a video signal translating means 406. The information contained in the Holotape is displayed by means of a picture tube of the television display means.

I claim:

1. A method of pressing a holographic relief pattern of an object spacially modulated in at least two dimensions from a metal holographic master onto a flexible thermoplastic tape capable of being rolled on a reel to form a replica of said relief pattern having an average relief depth of about 500 A comprising the steps of
    a. passing said thermoplastic tape and said holographic master simultaneously through a pair of calender rollers with a pressure of from about 10 to 200 psi,
    b. heating said thermoplastic tape indirectly to a temperature from about 0.3 to 0.85 times the flow temperature of said thermoplastic tape as it passes through said calender rollers by heating said master in contact with said tape,
    c. cooling the thermoplastic replica formed thereby,
    d. separating the thermoplastic replica from said holographic master, and
    e. rolling said replica on a reel for storage.

2. The process of claim 1 wherein said thermoplastic tape has a thickness of from 1 to 6 mils and wherein said holgraphic master is of nickel.

3. The process of claim 1 wherein heat is applied to the thermoplastic tape by heating the calender roller in contact with the metal master.

4. The process of claim 1 wherein each of said calender rollers have yieldable surfaces.

5. The process of claim 2 wherein said thermoplastic tape has a maximum elongation before rupture of 5 percent at 25°C.

6. A method for replicating a holographic relief pattern comprising the steps of
    a. passing a transparent, cast vinyl, thermoplastic tape and a holographic master simultaneously through a pair of calender rollers having yieldable surfaces at a speed of about 20 inches per second,
    b. applying heat to said master to bring said vinyl thermoplastic tape to a temperature of from about 0.3 to 0.85 times the centigrade flow temperature of said vinyl tape,
    c. applying a pressure of from about 10 – 200 psi to the vinyl tape and holographic master as they pass through said calender rollers so as to press the holographic relief pattern into said tape,
    d. cooling the embossed tape after it passes through said calender rollers,
    e. separating said embossed tape from said master, and
    f. winding said embossed tape onto a reel.

7. A method for forming a replica of a holographic relief pattern having an average depth of 500 A which comprises
    a. passing a flexible, embossable thermoplastic tape and a metal master having a holographic relief pattern on a surface thereof simultaneously between a pair of calender rollers so as to press said relief pattern into said tape under pressure of from about 10 – 200 psi,
    b. heating said master to a temperature which is substantially below the flow temperature of said tape while said master is in contact with said tape, c. cooling said tape while it is in contact with said master, d. separating said tape now having said relief pattern embossed on a surface therof from said master.

8. The method of claim 7 wherein said thermoplastic tape is cast vinyl having a belt side and an air side and wherein said relief pattern is pressed into said belt side of said cast vinyl.

* * * * *